United States Patent Office 2,715,599
Patented Aug. 16, 1955

2,715,599

METHOD OF MAKING INSECTICIDAL CALCIUM ARSENATE BATCH

John S. Les Veaux, Middleport, and Calvin M. Tidwell, Medina, N. Y., assignors to Food Machinery and Chemical Corporation, San Jose, Calif.

No Drawing. Application March 10, 1951, Serial No. 215,030

5 Claims. (Cl. 167—15)

The present invention relates to an improved procedure for manufacturing insecticidal calcium arsenate and to a product of improved characteristics.

Methods have been proposed heretofore for manufacturing calcium arsenate but both the method and the product suffer certain disadvantages, namely, the substantial impossibility of obtaining what is designated a "lime-free" calcium arsenate. In the prior art procedure, the calcium arsenate is made from lime and arsenic acid, alone, without the addition of other compounds and merely by contact. This operation is described at great length in U. S. patent to Arthur Henninger of July 5, 1938, No. 2,122,861.

A greatly improved method and end product may be prepared by following the procedure outline in an application for patent of one of us, filed October 10, 1950, Serial No. 189,317, which application is a continuation-in-part of Serial No. 583,773 filed March 20, 1945, now abandoned.

In said application, there is described an improved procedure for obtaining so-called insecticidal calcium arsenate which calcium arsenate is of a pH within very restricted limits and which possesses a soluble arsenic content as determined by the Geneva method of a relatively small percentage of total arsenic. Furthermore, by the procedure of said application, the total combined arsenic content is substantially greater than the total arsenic content capable of being obtained by the process of said patent. In contrast to the 42% total $As_2O_5$ obtainable by the procedure of the patent, it is possible to obtain from 48 to 52% more or less $As_2O_5$ by following the procedure of said application.

In accordance with the procedure of said application the arsenic acid is added to the lime slurry in a predetermined amount and less than the quantity required to neutralize the total amount of lime in the batch to which the arsenic acid is added. Thereafter and by successive approximations, additional small quantities of arsenic acid are added to the batch until substantial neutrality is obtained. A product of extremely desirable chemical characteristics can thus be obtained, but the operation requires the development of a considerable degree of skill in the technical handling of the operation.

It is an object of the present invention to provide a method of producing an insecticidal calcium arsenate in periods of time somewhat less than heretofore required, and by the employment of operators of less training and skill than are required when arsenic acid alone is used as the neutralizing agent for the lime.

It is also an object of the present invention to provide a procedure for manufacturing insecticidal calcium arsenate which is substantially chemically unreactive with organic insecticides when mixed therewith to prepare a formulation providing all the desirable properties of the organic insecticide plus the desirable properties of calcium arsenate itself.

It is also an object of the invention to prepare an improved insecticidal calcium arsenate which, by reason of the low water soluble arsenic content, possesses a greatly decreased phytocidal action upon the plants to which the calcium arsenate is applied as an insecticide.

In the broad concept of the invention, calcium arsenate is prepared in its initial steps by the addition, under violent agitation, of arsenic acid to a lime slurry of predetermined lime content. In general, the amount of arsenic acid employed is somewhat less than that required for the stoichiometric reaction with the calcium oxide of the hydrated lime for the production of so-called insecticidal calcium arsenate. The amount of arsenic acid added will be less than the quantity required completely to react, and generally within 1% to ½% of that quantity.

In actual plant operation, an indicator or dye possessing the property of being decolorized by slurries of calcium hydroxide is added to the batch and used as an internal indicator as, for instance, methyl violet 2B concentrate. Color return takes place when the unreacted lime content of such a slurry to which arsenic acid is being added, reaches about 0.75% to 1% of the original lime content. When the color of the sludge issuing from the mixing nozzles possesses a slight violet tint the rate of flow or addition of the arsenic acid to the lime slurry is decreased and such addition stopped when the whole batch in the mixing tank possesses the characteristic slight purple tinge. This indicates the presence of only a small amount of free lime generally about 0.2%. The mixing may be performed in equipment of the type illustrated in the application of John F. Les Veaux, Serial No. 189,317, filed October 10, 1950, mentioned above.

In accordance with the present invention, the remaining free lime is reacted with a material producing products either of relatively low solubility or of low pH if soluble, whereby an insecticidal calcium arsenate is produced, the pH of the dried finished product being about pH7.5 and below a pH of 12, and preferably a pH of 7.5 to a pH of 10.

The materials used for reacting with the slight excess of free lime are generally salts of metals with a valence of two or more, and may be the soluble salts of such acids as sulfuric acid, acetic acid, nitric acid, hydro halides, carbonic acid, phosphoric acid and carbonic acid itself. In general, these materials are weakly acidic in water solution and produce therein a pH of between about 2 to 10. Furthermore, the pH of the products of the reaction of such materials with a calcium arsenate slurry containing less than 1% of free calcium oxide, either separately or combined, will be between pH 7.5 and less than pH 12, and generally between 7.5 and pH 10. Furthermore, the reactivity of these compounds with the tricalcium arsenate constituting the insecticidal calcium arsenate is substantially nil, so that the material does not degrade or reduce the content of insecticidal calcium arsenate, but reacts preferentially with any free calcium hydroxide present in the slurry in uncombined form. Furthermore, any products produced by the reaction of the added material of the type above defined, are present in the final insecticidal calcium arsenate in amounts less than about 0.5% and generally less than about 0.1% and, like the insecticidal calcium arsenate, are compatible with organic insecticides inducing substantially no degradation of such chemical materials.

The neutralizing materials described above may be added to the batch of lime and arsenic acid in any suitable fashion as, for instance, by adding to the slurry of calcium arsenate containing a small amount of unreacted lime, a relatively concentrated water solution of the final neutralizing and reacting material. This may be done by making the addition through the arsenic acid nozzle or into the discharge from the recirculation system immediately adjacent to the discharge pipe. Where carbon dioxide is employed to finish off the batch, it may be added in gaseous form through a suitable discharging device placed either in the recirculating system or in the agitation chamber holding the bulk of the slurry.

The following examples are given as illustrative of the principles of the invention and are not to be deemed as limitations upon the invention, since a wide variety of materials can be employed for the purpose of finishing off the batch with the production of an insecticidal calcium arsenate of high total $As_2O_5$ content, a relatively low pH within the limits heretofore described, and a relatively low soluble arsenic content as determined by the Geneva method.

EXAMPLE I 3150 lbs. of quicklime was hydrated and diluted to about a 25% slurry. This slurry was transferred to a tank equipped with a recirculating device as described in the Les Veaux application, Serial No. 189,317. The reaction was carried out as described in Example II of said application wherein the arsenic acid is added to the lime slurry while the whole admixture is subjected to violent agitation until a sample of the slurry showed 0.55% of the original lime unreacted. The rate of flow of both the streams of arsenic acid and the lime slurry into the reaction chamber are each maintained at a different and predetermined substantially constant rate such that the rate of flow of the arsenic acid is sufficiently low relative to that of the lime slurry to maintain at least a slight amount of unreacted hydrated lime in the reaction chamber throughout substantially the whole of the reaction process.

In the present example this rate of flow of the arsenic acid is about 0.4 gallon per minute and that of the lime slurry is about 500 gallons per minute.

By the foregoing procedure the hydrated lime slurry is converted to basic calcium arsenate at a substantially constant rate. This substantially constant rate of conversion of the hydrated lime slurry is determined by titration of several representative samples of the slurry containing the unreacted lime taken from the reservoir at intervals during the process after temporarily stopping the addition of the arsenic acid, using hydrochloric acid of fixed but not necessarily known strength and thymolphthalein indicator in making the titration.

From this known rate of conversion of the unreacted lime, determined in the manner just described, the total time from the beginning of the addition of the arsenic acid which is required to convert substantially all the lime to basic calcium arsenate may in turn be readily ascertained and in the present example the addition of the arsenic acid is stopped at the end of this total period of time. The arsenic acid addition was stopped and an aluminum sulfate solution (300 lbs. of $Al_2(SO_4)_3 \cdot 18 H_2O$ per 100 gallons of water) added until the pH of the slurry reached 8.5. Additional increments of the aluminum sulfate solution were added until the pH remained constant at this value for one-half hour. A total of 150 lbs. of aluminum sulfate was added.

A sample of the dried product had the following analysis:

Total $As_2O_5$ _____ 48.53
Water soluble $As_2O_5$ by the Geneva method (p. 8 Technical Bulletin 234, New York State Agricultural Experiment Station, Geneva, N. Y. October 1935) _____ 0.55%
pH (determined as a 20% slurry in distilled water after stirring for one hour) _____ 8.7

EXAMPLE II

The reaction was carried out as in Example I except that 1 lb. 9 oz. of methyl violet 2B concentrate was used as an internal indicator. This dye has the property of being decolorized by slurries of calcium hydroxide and it has been found by experiment that the color return takes places when the unreacted lime content of a slurry, such as described in Example I, reaches about 0.75 to 1% of the original lime content. Furthermore, the color of the sludge issuing from the mixing nozzle serves as a warning to cut the rate of flow of the acid.

The arsenic acid addition was continued until the slurry in the reservoir tank turned a faint purple color. A sample of the slurry showed 0.25% of the original lime unreacted. The arsenic acid addition was stopped and the aluminum sulfate solution added as in Example I. 147 lbs. of aluminum sulfate was added. The color of the batch was now a definite purple.

A sample of the dried product had the following analysis:

Total $As_2O_5$ _____ 48.87
Water soluble $As_2O_5$ by the Geneva method _____ 1.33
pH _____ 8.2

EXAMPLE III 200 grams of calcium oxide was slaked and placed in a laboratory model of the Les Veaux apparatus, diluted 1.5 liters with water, and heated to 85–90° C. Arsenic acid was added until 3% of the original lime was still unreacted. The arsenic acid addition was stopped and carbon dioxide gas added through the recirculation system at the rate of 100 ml. per minute until the pH of the slurry was 8.1. The product was dried and had the following analysis:

Total $As_2O_5$ _____ 48.44
Water soluble $As_2O_5$ by the Geneva method ____ 0.52
pH _____ 8.1

EXAMPLE IV

A calcium arsenate was prepared exactly like that in Example III except that a 20% solution of magnesium sulfate was used as the neutralizing agent. The resulting dried product had the following analysis:

Total _____ 48.27
Water soluble $As_2O_5$ by the Geneva method ____ 0.05
pH _____ 10.1

EXAMPLE V 200 parts of quicklime were slaked and placed in a laboratory model of the Les Veaux apparatus, diluted with 1500 parts of water and the whole heated to 95–100° C. 0.1 part of methyl violet 2B concentrate was added as an internal indicator. Arsenic acid was added as in the above examples until the entire mass had taken on a faint purple tint. There was about 0.5% free lime remaining at this point. A sample of this material was dried and analyzed as a check on the indicator. This dried sample had the following analysis:

Total $As_2O_5$ _____ 49.83
Water soluble $As_2O_5$ by the Geneva method ____ 0.31
pH _____ 12.5

200 parts of this slurry was treated with a dilute solution of copper sulfate until the pH of the slurry was reduced to 8.2 The volume of added copper sulfate solution was equivalent to 1.16 parts of anhydrous copper sulfate. The slurry was dried and had the following analysis:

Total $As_2O_5$ _____ 48.75
Water soluble $As_2O_5$ by the Geneva method ____ 0.25
pH as a 15% slurry _____ 8.0

EXAMPLE VI 200 parts of the lime arsenic acid slurry prepared in Example V was treated with a dilute solution of zinc sulfate until the pH was reduced to a pH of 8.4. The volume of added zinc sulfate solution was equivalent to 1.1 parts of anhydrous zinc sulfate. The slurry was dried and had the following analysis:

Total As₂O₅ ---------------------------------- 47.3
Water soluble As₂O₅ by the Geneva method ---- 0.16
pH as a 15% slurry -------------------------- 8.6

To show the especial advantage of the insecticidal calcium arsenate made in accordance with the present invention when in contact with organic insecticides, formulations were prepared containing calcium arsenate prepared in accordance with the prior art procedure of Henninger 2,122,861 and in accordance with the procedure of the present invention and mixed with dusts containing organic insecticides. The formulations were made generally with the usual dust base carrying the insecticide. Where benzene hexachloride was the insecticide, sufficient dust was used to obtain about 1% of gamma content while with admixtures of DDT this product was present in about 8⅓%.

The degradation of the organic insecticide was determined by determining the change in the water soluble chloride content of the mixture as hydrochloric acid is formed as the degradation product in each of the above cases.

Four samples of so-called calcium arsenate were prepared, one in accordance with Patent 2,122,861 and three in accordance with the present invention and formulations made with each containing DDT dust and another series with BHC dust. These were maintained at storage temperature and the soluble chloride content of the formulation determined at intervals and the increase in soluble chloride content calculated as per cent degradation of the respective organic insecticide. A marked difference in degree of degradation was apparent with a much slower rate of degradation present in those formulations made with insecticidal calcium arsenate made in accordance with the present invention. The results are set forth in the tables below.

TABLE I

*Degradation of BHC in calcium arsenates*

| | pH of Arsenical | Percent Degradation | | | | |
|---|---|---|---|---|---|---|
| | | 4 hours | 7 days | 20 days | 75 days | 225 days |
| 1 | +14.4 | 15.3 | 47.1 | 82.2 | 82.2 | 85.6 |
| 2 | 12.0 | 0.0 | 7.9 | 9.38 | 15.15 | 22.6 |
| 3 | 10.1 | 0.0 | 2.41 | 4.27 | 7.8 | 9.11 |
| 4 | 8.1 | 0.0 | 0.46 | 2.16 | 3.19 | 4.45 |

TABLE II

*Degradation of DDT in calcium arsenate*

| | pH of Arsenical | Percent Degradation | | | | |
|---|---|---|---|---|---|---|
| | | 4 hours | 7 days | 20 days | 75 days | 225 days |
| 1 | +12.4 | 16.7 | 53.3 | 63.6 | 90.8 | 87.5 |
| 2 | 12.0 | 0.0 | 1.68 | 7.70 | 10.8 | 26.6 |
| 3 | 10.1 | 0.0 | 2.88 | 6.37 | 12.13 | 23.8 |
| 4 | 8.1 | 0.0 | 2.28 | 1.68 | 5.28 | 16.5 |

Calcium arsenate #1 was made in accordance with the prior art procedure and #2, 3 and 4 by the process of the present invention. These products had the following analysis:

| | Total As₂O₅ | pH | Percent Free CaO | Geneva Arsenic |
|---|---|---|---|---|
| 1 | 44.82 | 12.4 | 0.69 | 1.14 |
| 2 | 48.53 | 8.7 | 0.00 | 0.55 |
| 3 | 48.27 | 10.1 | 0.00 | 0.05 |
| 4 | 48.44 | 8.1 | 0.00 | 0.52 |

The pH produced by a saturated calcium hydroxide solution is about pH 12.4 and the calcium arsenate #1 contains sufficient free lime to produce relatively rapid degradation of the organic insecticides while the calcium arsenate made in accordance with the present invention had a pH of 12 or less and contained no free lime and the degradation was greatly reduced.

What is claimed is:

1. In the method of making insecticidal calcium arsenate by adding arsenic acid to an aqueous lime slurry in batch operation while the whole admixture is subjected to violent agitation, the improvement which comprises adding the arsenic acid to the lime in an amount insufficient to neutralize completely the lime in the batch and continuing such arsenic acid addition until the batch contains some unreacted lime which is less than 1% by weight of the original lime added and then adding to the slurry sufficient amount of an aqueous solution of a water soluble weakly acidic salt of a metallic ion other than calcium and having a valence greater than one to produce in the slurry a pH between 7.5 and 12 and then adding additional increments of such salt solution until the pH of the batch remains constant for one-half hour in that range.

2. In the method of making insecticidal calcium arsenate by adding arsenic acid to an aqueous lime slurry in batch operation while the whole admixture is subjected to violent agitation, the improvement which comprises adding the arsenic acid to the lime in an amount insufficient to neutralize completely the lime in the batch and continuing such arsenic acid addition until the batch contains some unreacted lime which is less than 1% by weight of the original lime added and then adding to the slurry sufficient amount of an aqueous solution of aluminum sulfate to produce in the slurry a pH between 7.5 and 12 and then adding additional increments of such salt solution until the pH of the batch remains constant for one-half hour in that range.

3. In the method of making insecticidal calcium arsenate by adding arsenic acid to an aqueous lime slurry in batch operation while the whole admixture is subjected to violent agitation, the improvement which comprises adding the arsenic acid to the lime in an amount insufficient to neutralize completely the lime in the batch and continuing such arsenic acid addition until the batch contains some unreacted lime which is less than 1% by weight of the original lime added and then adding to the slurry sufficient amount of an aqueous solution of magnesium sulfate to produce in the slurry a pH between 7.5 and 12 and then adding additional increments of such salt solution until the pH of the batch remains constant for one-half hour in that range.

4. In the method of making insecticidal calcium arsenate by adding arsenic acid to an aqueous lime slurry in batch operation while the whole admixture is subjected to violent agitation, the improvement which comprises adding the arsenic acid to the lime in an amount insufficient to neutralize completely the lime in the batch and continuing such arsenic acid addition until the batch contains some unreacted lime which is less than 1% by weight of the original lime added and then adding to the slurry sufficient amount of an aqueous solution of copper sulfate to produce in the slurry a pH between 7.5 and 12 and then adding additional increments of such salt solution until the pH of the batch remains constant for one-half hour in that range.

5. In the method of making insecticidal calcium arsenate by adding arsenic acid to an aqueous lime slurry in batch operation while the whole admixture is subjected to violent agitation, the improvement which comprises adding the arsenic acid to the lime in an amount insufficient to neutralize completely the lime in the batch and continuing such arsenic acid addition until the batch contains some unreacted lime which is less than 1% by weight of the original lime added and then adding to the slurry sufficient amount of an aqueous solution of zinc sulfate to produce in the slurry a pH between 7.5 and 12 and then adding additional increments of such salt solution until the pH of the batch remains constant for one-half hour in that range.

References Cited in the file of this patent

UNITED STATES PATENTS

| | | |
|---|---|---|
| 1,532,577 | Cullen | Apr. 7, 1925 |
| 2,376,740 | Waters et al. | May 22, 1945 |
| 2,586,519 | Collins | Feb. 19, 1952 |

OTHER REFERENCES

De Ong, "Chemistry and Uses of Insecticides," Reinhold Publish. Corp., New York, p. 14.